S. P. MacCORDY.
BUTTON TURNING AND FINISHING MACHINE.
APPLICATION FILED APR. 27, 1904.
968,673.
Patented Aug. 30, 1910.
8 SHEETS—SHEET 1.
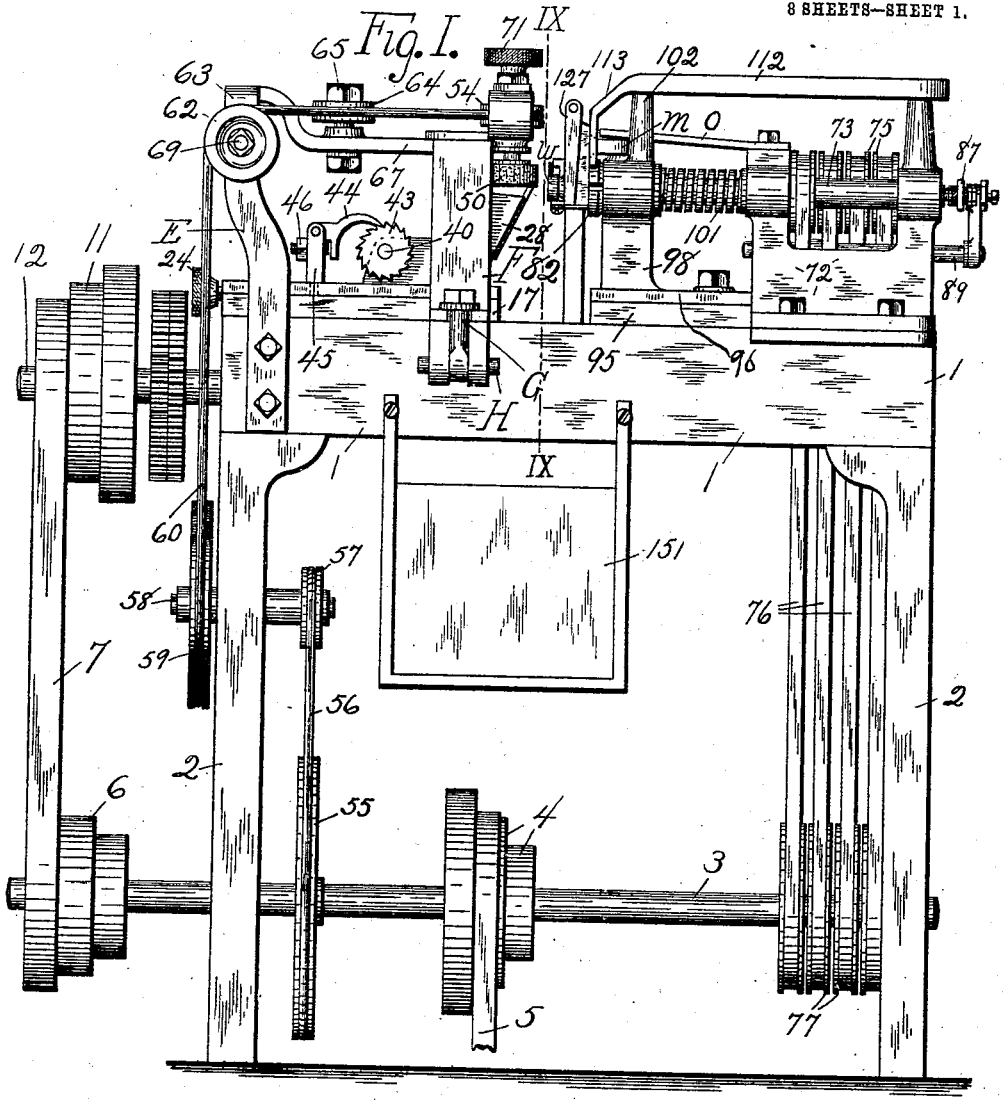
Fig. I.
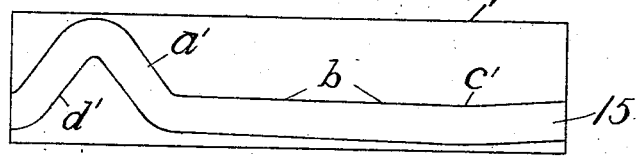
Fig. XXII.
WITNESSES:
CBSchoeneck
M E Gagne
INVENTOR
Samuel P. MacCordy
BY
Alfred Wilkinson
ATTORNEY.

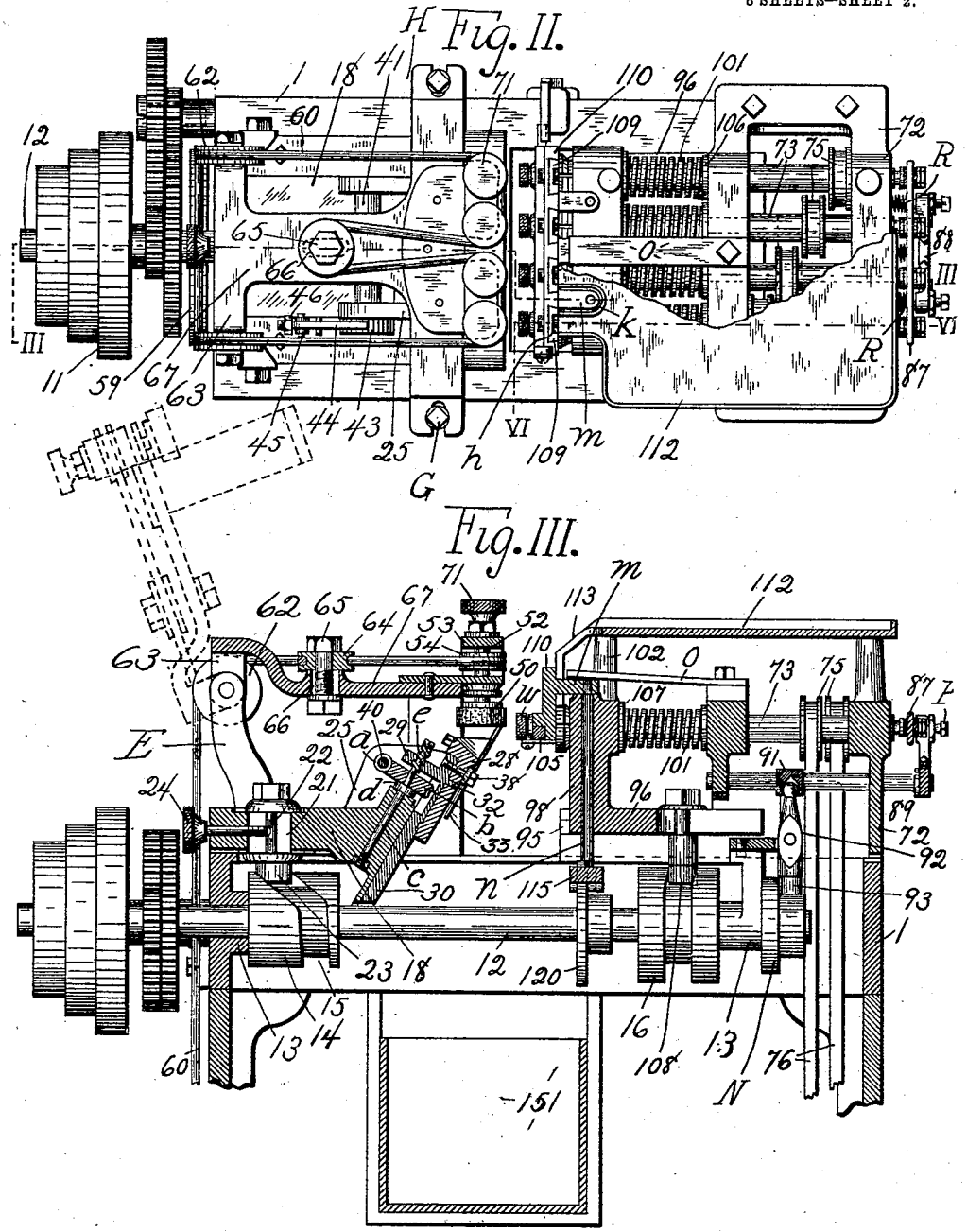

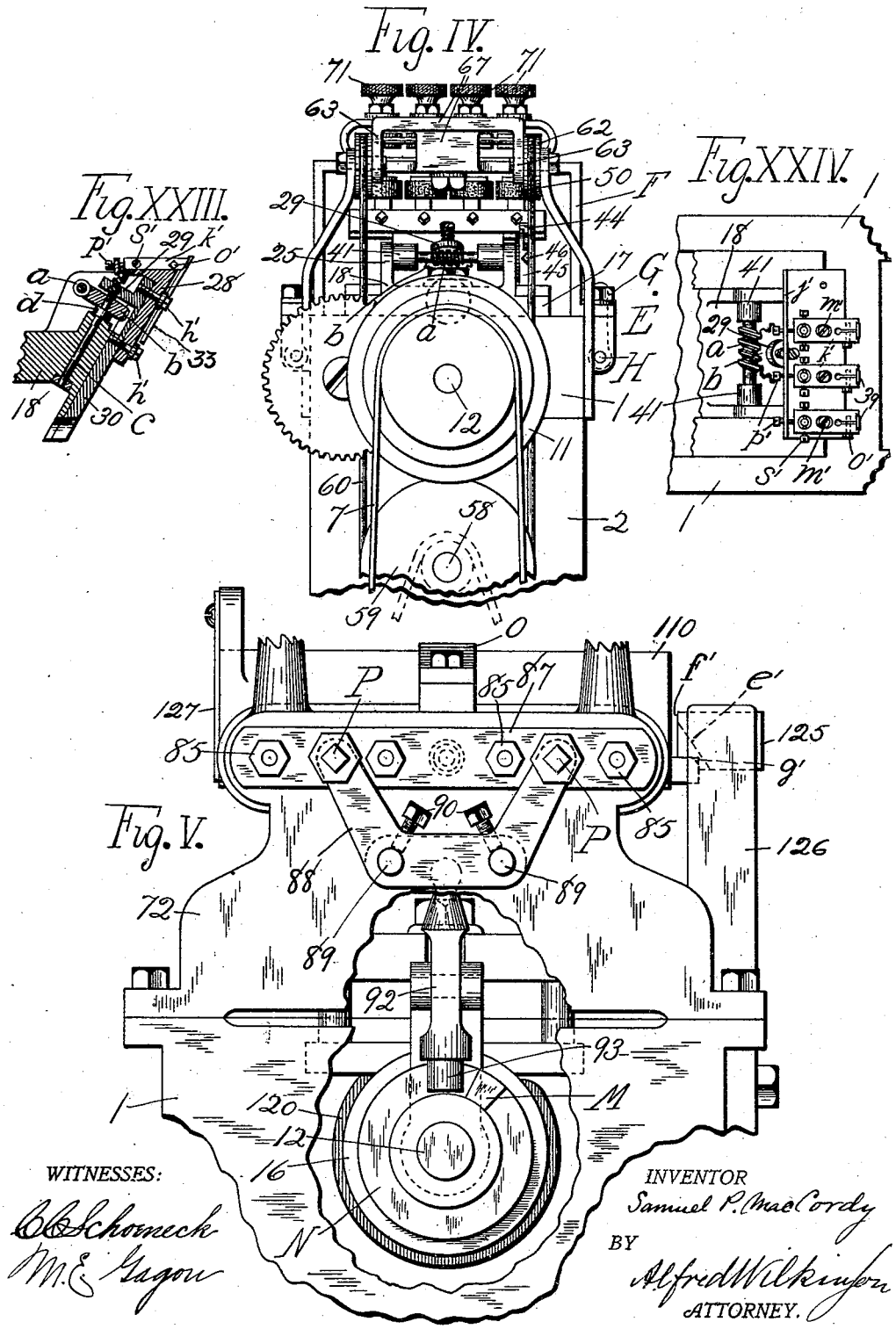

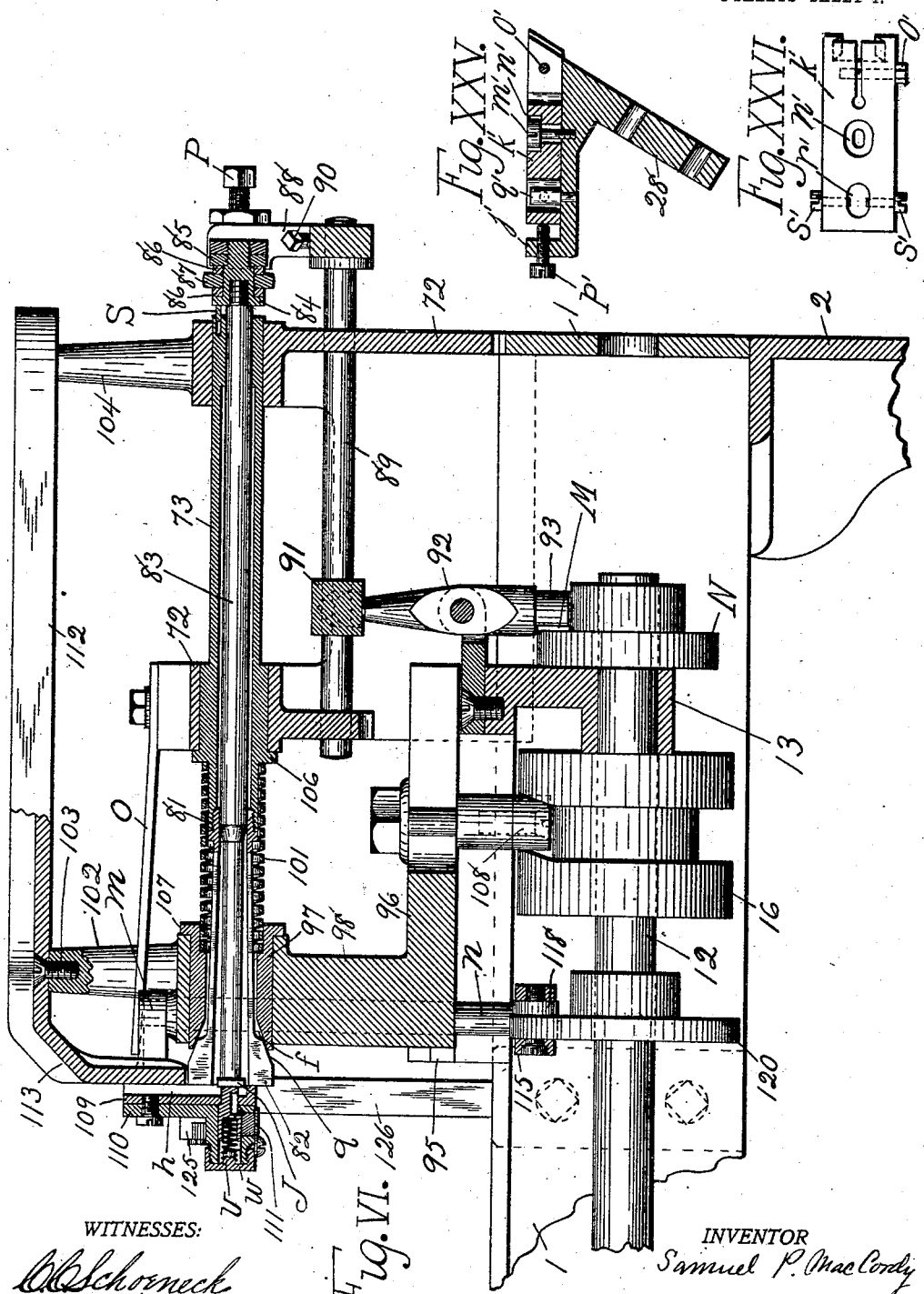

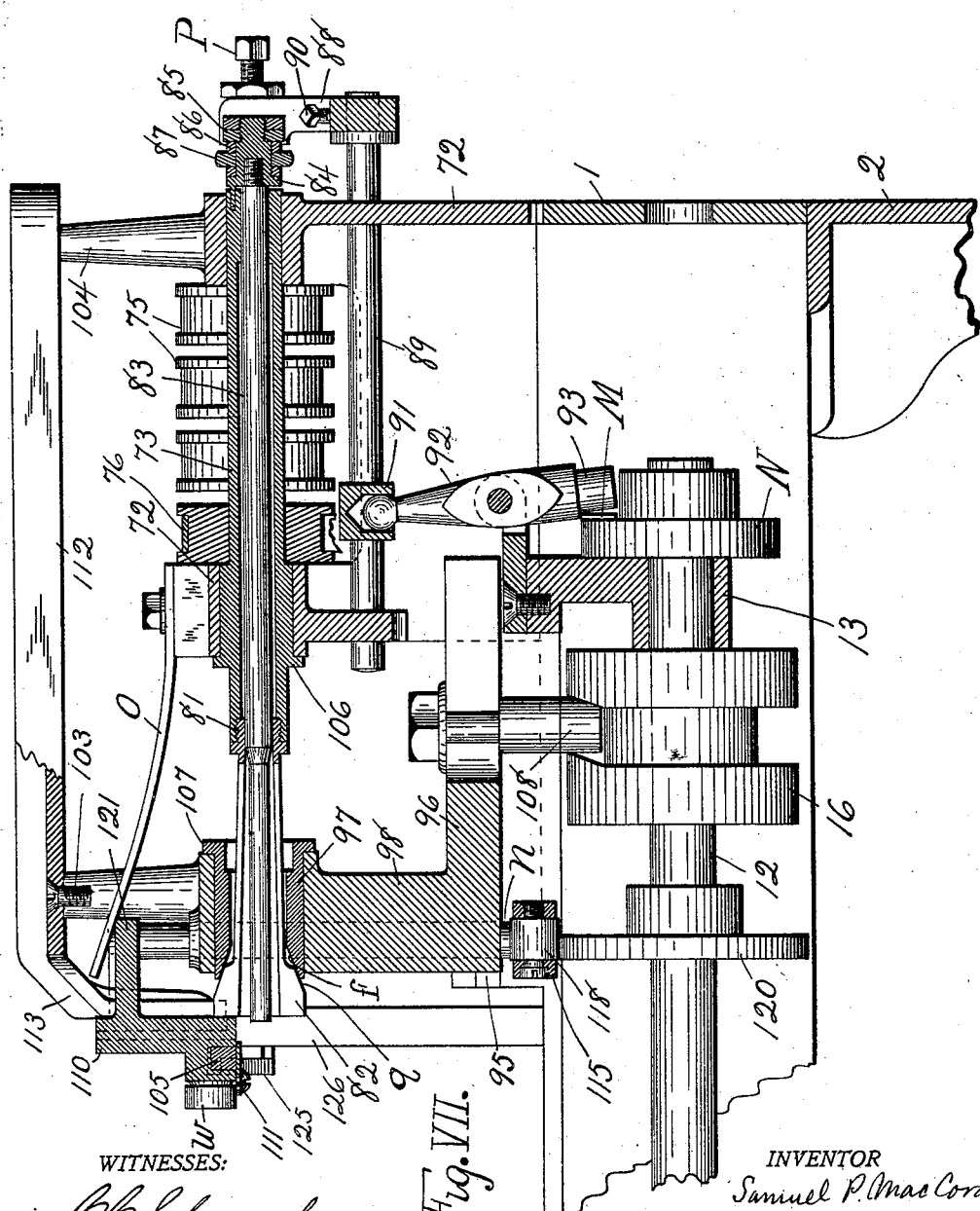

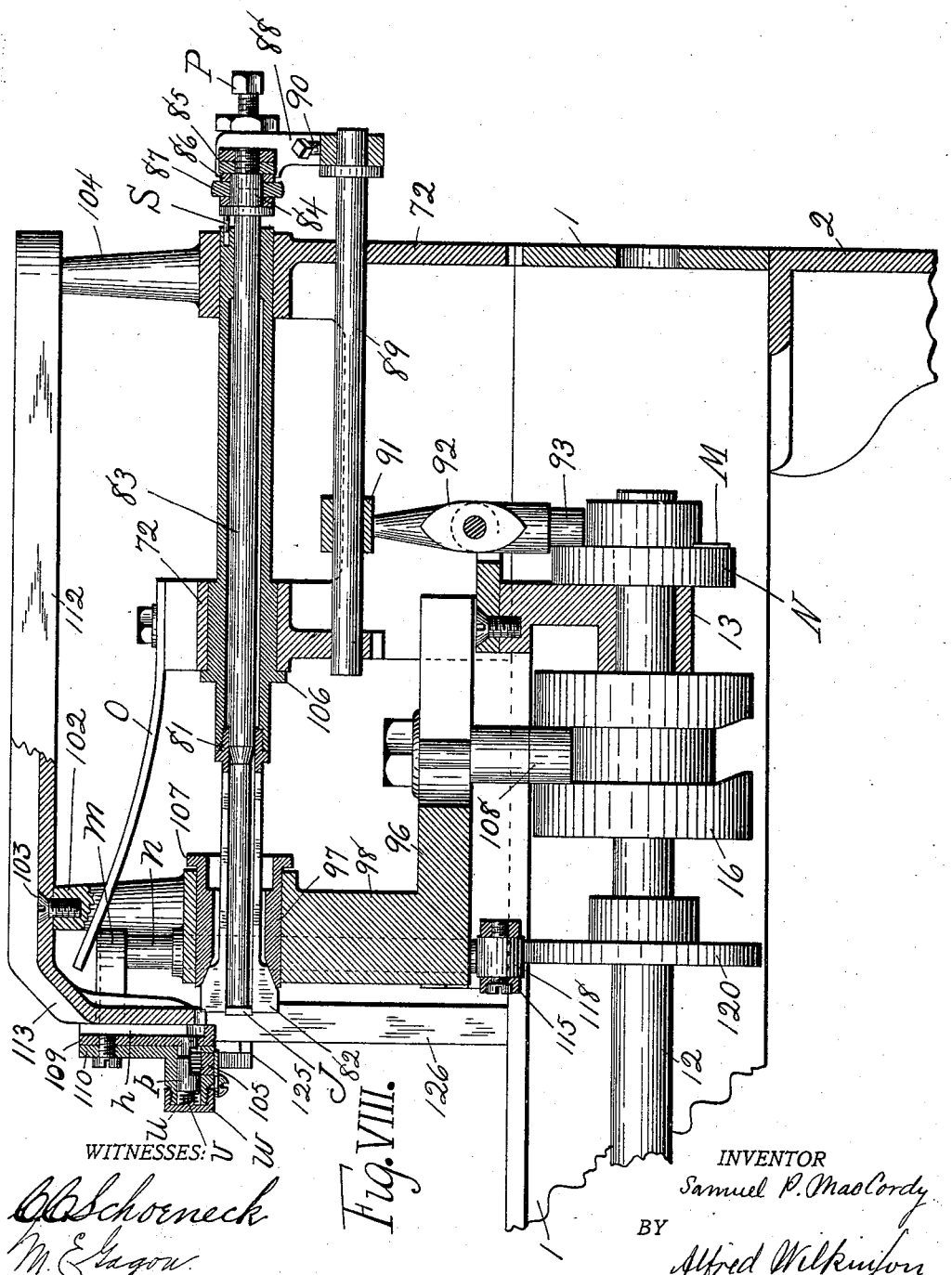

S. P. MacCORDY.
BUTTON TURNING AND FINISHING MACHINE.
APPLICATION FILED APR. 27, 1904.
968,673.
Patented Aug. 30, 1910.
8 SHEETS—SHEET 7.
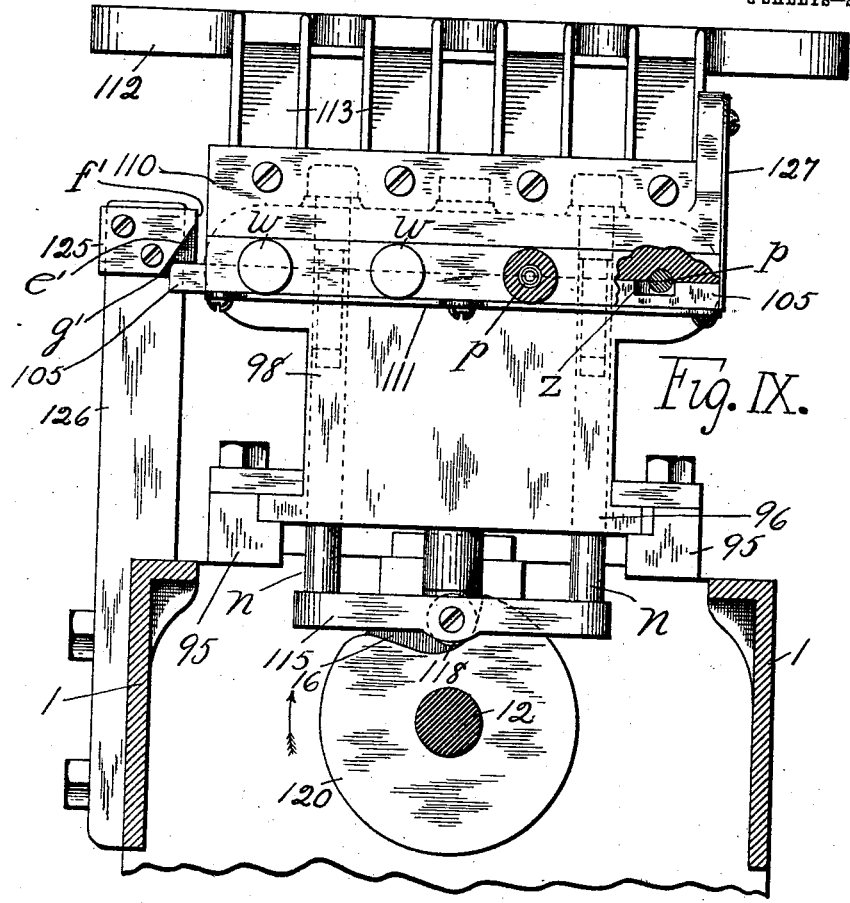
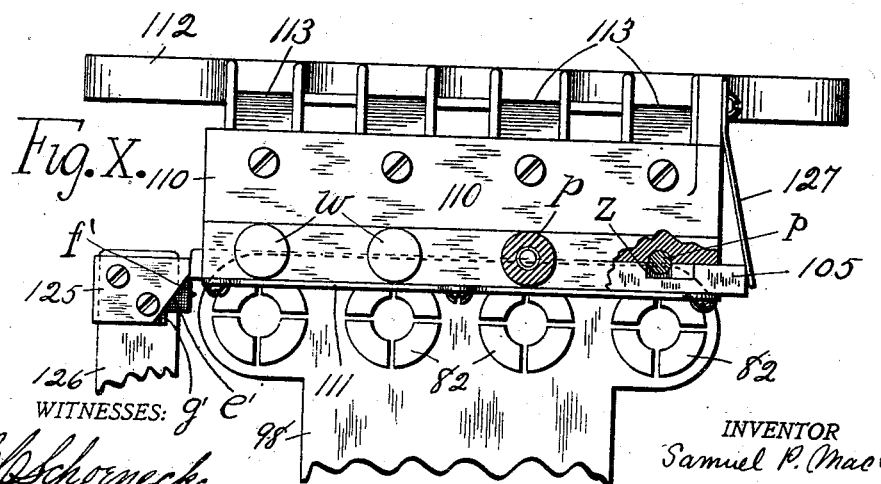
WITNESSES:
INVENTOR
Samuel P. MacCordy
BY
Alfred Wilkinson
ATTORNEY.

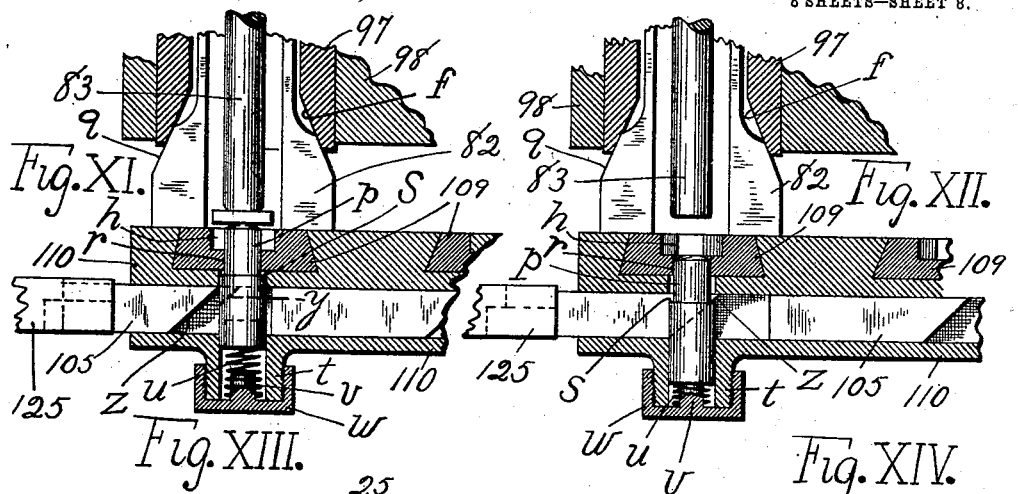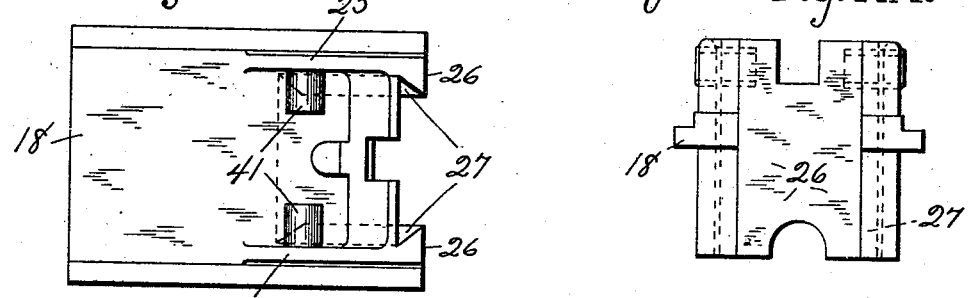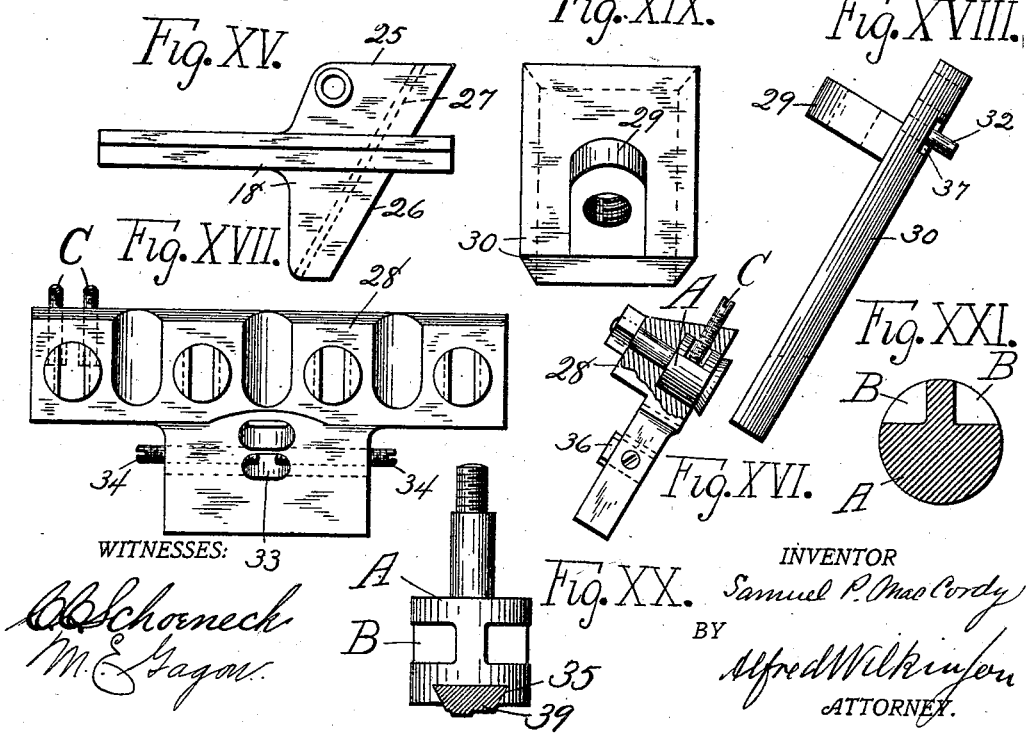

UNITED STATES PATENT OFFICE.

SAMUEL P. MacCORDY, OF AMSTERDAM, NEW YORK.

BUTTON TURNING AND FINISHING MACHINE.

968,673.  Specification of Letters Patent.  Patented Aug. 30, 1910.

Application filed April 27, 1904. Serial No. 205,092.

*To all whom it may concern:*

Be it known that I, SAMUEL P. MACCORDY, a citizen of the United States, residing at Amsterdam, in the county of Montgomery and State of New York, have invented certain new and useful Improvements in Button Turning and Finishing Machines; and I do hereby declare the following to be a full, clear, and exact description of the invention, such as will enable others skilled in the art to which it appertains to make and use the same.

My invention relates to a button turning and finishing machine, in which blanks of mother of pearl or other suitable material are delivered to rotating chucks and there turned and finished by a reciprocating tool.

It consists in a machine of new construction and mode of operation, and the various parts of said machine by which the various operations of delivering blanks to the chucks, closing and opening the chucks, ejecting the blanks therefrom, reciprocating the tool toward and from the blank, feeding the tool up gradually into operative position and grinding the tool, are automatically performed.

The machine consists essentially of two main parts—the blank holding part, comprising a gang of chucks having chuck jaws carried on rotating spindles, ejector rods arranged within the spindles to force out the finished buttons, a carriage and a chuck sleeve thereon arranged around the chucks to close the jaws, springs to force said chuck sleeves rearwardly to engage with the jaws, a button table, chutes therefrom, vertical, reciprocating pockets to deliver the buttons to the chucks, a spring to depress the pockets, a finger to force the blanks from the pockets into the chucks, a sliding piece to retract the fingers, and cams on the shaft to operate these parts; and of the tool operating part of the machine, comprising the tool carriage, means to reciprocate the carriage, tool block carriers, tool blocks and tools, one for each chuck, emery wheels arranged above the tools, and a ratchet mechanism for feeding the tools upward step by step and very gradually, so that they are sharpened and their cutting edges maintained always in the same relation to the axis of the chucks, that is, to the axis of the button blanks retained therein.
My invention will be understood by reference to the drawings herewith, in which the reference letters and numerals of the specification indicate the corresponding parts in all the figures.

Figure I is a side elevation of my machine.
Fig. II is a top plan. Fig. III is a vertical section on line III III of Fig. II. Fig. IV is an end elevation. Fig. V is an end elevation enlarged of a portion of the other end of the machine. Figs. VI, VII and VIII are enlarged sections, on line VI VI of Fig. II, of the chucks, pockets and adjacent parts in three positions. Fig. IX is a vertical cross section on line IX of Fig. I looking toward the front of the chucks. Fig. X is a portion of Fig. IX, showing the parts in different positions. Figs. XI and XII are horizontal sections through the center of a chuck showing the blank delivering mechanism in two positions. Figs. XIII, XIV and XV are respectively top plan and front and side elevations of the tool carriage detached. Figs. XVI and XVII are respectively side and front elevations of the tool block detached. Figs. XVIII and XIX are respectively side elevation and top plan (the former partially in section) of the tool block carrier. Figs. XX and XXI are respectively plan and cross section of the tool bolt. Fig. XXII is a development of the feed cam roller. Figs. XXIII, XXIV, XXV and XXVI are views of a preferred means for holding the knife, being respectively vertical section, top plan, vertical section of portions enlarged and top plan of knife plate.

In the figures, 1 indicates the main frame or the bed of the machine, carried on legs 2 2, in which is suitably journaled the driving shaft 3, operated by the power pulley 4 and belt 5 and carrying at its rear end pulley 6, which carries belt 7; pulley 11 on main shaft 12 journaled in bearings 13 13 in the bed and carrying near its rear end cam feed roller 14, having feed cam groove 15, and at its forward end grooved cam 16.

*Tool carriage.* (Figs. III, XIII to XXI.)—To ways 17 is fitted the tool carriage 18, slotted at 21 for the bolt 22, there adjustably clamped to the carriage and carrying the anti-friction roller 23, engaging with cam groove 15. A set screw 24 is arranged to adjust the position of this bolt 22 with reference to the carriage, and thereby adjust the movement of the carriage and the tool for buttons of different thicknesses.

The carriage is provided with integral brackets 25 25 and an inclined front face 26, having dovetail way 27 to receive the carrier 30, having rear threaded ear 29, and pin 32 engaging in slot 33 of tool block 28, between two adjusting screws 34 by which the position of the tool block carrier on the tool block is slightly laterally adjustable, 36 being studs or lugs on the tool block engaging with guide grooves 37 in the carrier on each side of the pin.

38 is a clamping bolt securing the block to the carrier after it has been arranged in proper position.

In the top of the tool block are secured the tool bolts A A having dovetail slots 35 for the tools 39, and side pockets B B with which engage set screws C C, carried in the tool block, by which each tool bolt may be slightly rotated in one direction or the other and delicately adjusted on its shank to change the position of the tool and center it on the blank.

*Tool feed.* (Figs. I, II, III, IV, XIII.)— As here shown four tools are provided for simultaneously finishing four buttons and the tools are automatically sharpened during the operation of the machine by means of four emery wheels 50 50 against which the tools are fed up very slowly by means of the following mechanism:—Cross shaft 40, journaled in bearings 41 in carriage brackets 25, carries the worm $a$, engaging the worm gear $b$, on the inclined shaft $c$, journaled in position in the carriage by means of a collar $d$ and suitable nut, and having thread $e$ on its upper end to engage with threaded rear ear 29 on the carrier, whereby the carrier, block and tools are fed upward very slowly as shaft 40 is rotated, on which is keyed the ratchet wheel 43, turned by engagement with ratchet pawl 44, hung on a standard 45, supported on the top plate of the ways 17, and adjustable, higher or lower, by its adjusting bolt 46 so as to engage to a greater or less extent with a single tooth or with one or more teeth to regulate the feed of the tool, which may be very slow and may be regulated very delicately, as aforesaid, by adjusting the pawl up or down so as to increase or diminish the amount of rotation of the ratchet.

*Grinding mechanism.* (Figs. I, II, III.)—The emery wheels 50 50 are secured by suitable nuts and shoulders to their shafts 52, journaled in bearing 53, to carry the grooved pulleys 54, rotated from the driving shaft 3, carrying the grooved pulley 55, by the belt 56 engaging with the smaller pulley 57 on the inner end of the counter shaft 58, carrying on its outer, rear end the pulley 59, from which the belt 60 extends to the pulleys 54, over the intermediate pulleys 62, carried on rear arms 63 and around the adjusting idler 64, adjustably secured in position by bolt 65 arranged in slot 66, on the grinding frame 67, supported on said rear arms 63, hinged at 69 to standards E E, and locked in position by locking arms F downwardly depending on each side, with which engage locking bolts G, hung on pivots H on the sides of the frame, which bolts may be loosened and the grinding frame swung back as shown in dotted lines in Fig. III to give more convenient access to the tool carriage and parts thereon.

As shown in Fig. XXII the cam groove 15 is so formed at $a'$ that the tool carriage and the tool are moved rapidly toward the button until nearly in engagement therewith, when they are fed very slowly during the cutting period toward the button by a lesser inclination $b'$ in the groove, making a uniform cut, whereby breaking of the button is avoided; at the forward points $c'$ of the cam groove the tool carriage rests momentarily until the button is finished and the tool is then in engagement with the button, giving it a smooth polished surface, after which the return stroke by incline $d'$ is rapid back to the point of starting.

71 are adjusting screws for slightly adjusting up and down the emery wheels so as to adjust them correctly with relation to axis of chucks and blanks. The tools may be set so that they project a suitable distance above the top of the block, and having been ground down after use for some time, the tool can be raised and adjusted by loosening of the nuts and bolts, and the tool block 28 proportionately lowered by turning back the ratchet until the proper engagement with the button of the grinding wheel is effected. It will be understood the ratchet is arranged to effect the very slight elevation of the tool on its return, so that it is ground in passing back under the grinding wheels, or the tool block may be quickly raised or lowered by a turn of the inclined shaft $c$, provided with a screw or slot for tool at its upper end, and thread $e$ may have rather a steep pitch, so that a short turn only is necessary.

*The chucks.* (Figs. I, II, III, V–VIII.)—On the front of the frame is the spindle head 72 with front and rear bearings arranged in pairs, in which are journaled the chuck spindles 73, each carrying a pulley 75 operated by belts 76 from pulleys 77 on the driving shaft. To each spindle is connected, by the threaded connection 81, the resilient expanding chuck jaws 82 to receive the blank J. Supported in the front end of each spindle and also in the front ends of the chucks, are the ejector rods 83; these rods are all connected, each by its sleeve nut 84, jam nuts 85, and washers 86, to a common cross bar 87, carrying depending arms 88, which may be made in one piece, or connected together, as best shown in Fig. V. To the lower ends of these arms are connected two guide rods 89, by set screws 90, fitted to openings in the spindle head and carrying block 91, which engages with the upper spherical ends of the cam lever 92, journaled on the frame and having on its lower end an anti-friction roller 93, which engages with small cam face M on cam N, by which the ejector rod is forced back a short distance to eject positively and at the proper time the finished blank from the chuck. Set screws P P are provided for adjusting the relation of the ejector rods to the cross-bar and springs R R (Fig. II) tend to return it to normal position after the blanks have been ejected. Sleeve nuts 84 may be provided with guide pins S fitting holes in the spindle to preserve the alinement of the parts.

The main frame has ways 95 (Fig. I) for the chuck-sleeve carriage 96, carrying the chuck sleeves 97 in standard 98, forced forward to close the chuck jaws on the blank by the main springs 101, and retracted to permit the jaws to expand and release the blanks by the anti-friction roller 108, longitudinally adjustable on this carriage and engaging with the cam groove in cam 16 on main shaft. The springs 101 are arranged to rotate with the other parts between the shoulder 106 (called the "washer") and the counter-sunk forward end of sleeve 97, flanged at 107 to engage with the carriage standard. These sleeves have beveled rear openings $f$ to engage with the beveled outer surfaces $q$ of the jaws 82, whereby each chuck, being independently closed by its own spring, may adapt itself to variation in the size of the blanks.

*Blank delivering mechanism.* (Figs. I, II, III, VI, VII, VIII, IX.)—The table 112 is secured by screws 103 to bosses 102 on standards 98 of chuck carriage 96, to move with the carriage and its front end may rest slidably on bosses 104 on spindle head 72. The blanks or buttons are delivered from the table 112, down inclined chutes 113, which may be made integral with the table, to pockets $h$ having U shaped bottoms to receive the blanks and open faces opposite the chucks. There may be as many of these pockets as desirable (four as here shown) for receiving the desired number of blanks, and each pocket is preferably formed in a pocket-piece 109, fitted to dovetails in the pocket-plate 110 and removable therefrom, so that new pocket-pieces may be inserted provided with pockets of varying sizes adapted to the different sizes of blanks used. The pocket-plate 110, carrying the pockets, is arranged to rise and fall by means of its integral flange $m$, connected to the upper end of plunger $n$ (see in Figs. II and III) through openings $k$ made in the top of the table between the chutes, said plungers being fitted on each side to bearings in the chuck sleeve carriage, and preferably having their lower ends united by a cross bar 115 (Fig. IX), provided at its center with an anti-friction roller 118, to engage with cam 120 on main shaft, whereby the pocket plate and pockets are normally raised at the proper time away from the chucks, holding the button blanks, to clear the way for the approaching cutting knives, and after the preceding buttons are finished, again to be depressed to supply the fresh unfinished blanks to the chucks, positively, by means of the spring O, bearing downwardly on any suitable part of the pocket plate.

The buttons are expelled forwardly from the lower ends of the pockets into the chucks by means of spring pins $p$, engaging in openings $r$, having shoulders $s$ to retain each pin in its bearing $t$, and spiral springs $u$ fitting in the countersunk rear end of the spring pin, and guided by the guide lug $v$, on the securing cap $w$, threaded or otherwise engaging the rear end of the bearing $t$, to maintain the parts securely in place. These pins are positively withdrawn into their bearings so that they will not interfere with the descending blanks nor engage with the blank except when it is to be forced forwardly into the chuck by means of the mechanism best shown in Figs. IX, X, XI and XII. The pins are provided with inclined cut-outs $y$, on their lower surfaces, with which engage inclined faces $z$ on the sliding plate 105, supported in a corresponding cross groove in the bottom of the pocket plate, by retaining plate 111. As the pocket-plate 110 is elevated, this sliding plate 105 is forced to one side to retract the spring pins, by the engagement of its protruding end, as shown in Figs. IX and X, with the fixed cam block 125 supported at one side on standard 126; the sliding plate is restored to its normal position to permit the spring pins to operate as the pocket plate descends, by means of a flat spring 127, secured to the pocket plate and bearing on opposite end of the sliding plate. As soon as the blanks have been delivered from the pockets, the chuck carrying carriage, table and attached parts, are moved slightly forwardly, which closes the chucks and prevents engagement of the spring pins with the blanks. When the pocket plate ascends, the sliding plate 105, engages with the inclined face $e'$, on cam block 125, and when it has reached its top position, the cam carriage, etc., move forwardly so that as the pocket plate and pockets descend, the sliding plate engages with the vertical lateral face $f'$ of the cam block until it reaches the notch $g'$, into which it quickly springs, permitting the quick expulsion of the blanks from the pockets into the chucks.

*Mode of operation.*—The operation of the cams and the movement of the parts are so timed that at first while the ejector rod is retained in normal forward position by its springs, the pocket plates and pockets are first positively depressed by their spring to a position permitting the spring pins to operate and force the blanks into the chucks where they are gripped by the closing of the jaws, effected by the chuck sleeves being forced forward by the chuck sleeve springs. When the blanks are so gripped in the chucks, being continually rotated by the rotation of the spindle and the connected parts, the tool carriage is being fed forward by engagement of its stud roller with cam groove 15 of cam 14, and at the same time the pocket plate is being raised away from the blanks by the operation of cam 120 permitting the tools to be brought into engagement by the blanks. The tools are gradually fed to make the cut of the required depth and then are momentarily held stationary to finish the face of the blank. After the buttons are finished, the tools are rapidly withdrawn and the chuck sleeve carriage is retracted by means of its cam 16, permitting the chucks to be opened and the buttons to be expelled therefrom by the ejector rods, operated by cam face M, into any suitable receptacle, such as pockets 151. Meanwhile the tools are being withdrawn and fed up, as described, very slowly into contact with the emery wheels so that they are kept constantly sharp and in absolute alinement with the center of the chuck, or in suitable parallel relation with the axis of the chuck.

I do not limit myself to the exact construction and arrangement of parts here shown, because changes may be made therein without departing from my invention.

In Figs. XXIII to XXVI I have shown the construction I prefer for supporting the tools, knives or cutters, by which each cutter may be independently adjusted, both longitudinally and laterally. Tool block 28 is positively secured to carrier 30 by bolts $h'$ $h'$ and is provided on its flat upper surface with flange $j'$ for cutter plates $k'$ $k'$, secured each by bolt $m'$ in elongated slot $n'$ so that the plate $k'$ carrying cutter 39, clamped in dovetail by bolt $o'$, may be adjusted longitudinally by bolt $p'$. Seat is also provided with pin $q'$ extending into larger slot $r'$ in cutter plate, provided with two set-screws $s'$ $s'$, engaging with said pin, which set-screws may be loosened and tightened slightly to swing cutter-plate on bolt $m'$ giving the cutter the desired lateral adjustment; this adjustment is on an arc but the arc is very short, and thus each knife may be slightly adjusted in both directions to compensate for slight variations; after the cutter plate is adjusted, bolt $m'$ is tightened.

Having thus described my invention, what I claim and desire to secure by Letters Patent, is:—

1. In a button turning and finishing machine, the combination with a suitable supporting frame, of a series of chucks, a chuck sleeve carriage, means to rotate the chucks, means to close the chucks to grip the button blanks, a series of pockets supported to move vertically adjacent to the chucks, means to deliver the blanks into the pockets, means to elevate the pockets, a pocket-plate carrying pocket pins fitted to holes in the rear wall of the pockets to force the blanks therefrom into the chucks, springs to force the pins into the pockets, a sliding bar engaging with the pins to retract the pins when the pockets are elevated and means to slide the bar.

2. In a button turning and finishing machine, the combination with a suitable frame, of a series of chucks maintained in a constant position axially, means to rotate the chucks, a chuck-sleeve carriage having means to close and open the chucks, a cam to reciprocate the chuck-sleeve carriage, a series of vertically movable pockets on the chuck-sleeve carriage, one to each chuck, chutes to deliver the blanks to the pockets, a pocket-plate carrying said pockets, flanges on said pocket-plate, plungers fitted in suitable bearings secured to said flanges and supporting said pocket-plate and pockets, a rotary cam engaging with said plungers to elevate the pocket-plate, pocket carrying members and channel members, pins on the pocket-plate fitted to holes in the rear wall of the pockets to force the blanks through openings in the front of the pockets into the chucks, springs on said pins, a sliding bar in the pocket-plate having inclined faces to engage with inclined cut-outs on said pins, a spring to force said bar out of engagement with said pins, a fixed cam having an inclined face to engage with the sliding bar to force it into engagement with the pins when the pocket-plate is rising and having a straight face and notch to engage with sliding bar when pocket-plate is descending, a spring suitably supported on the machine, bearing on said pocket and tending to force the pockets downwardly, and a lever operated by a suitable cam engaging with the lower end of said plungers periodically to elevate the pockets and attached parts.

3. In the knife or cutter supporting mechanism of a button turning machine, the combination with a tool block, of cutter plates arranged in seats on the upper surface of the block, a securing bolt for each plate arranged in elongated slots in the plate, said plates having slotted front ends formed with inclined, dovetail grooves, cutters fixed to said grooves, cross bolts in the plates to clamp the cutters in the grooves, pins on the blocks extending into enlarged slots in the plates, and set screws arranged in each plate to engage with said pin.

4. In the blank gripping mechanism of a button turning machine, the combination with a suitable supporting frame and a spindle head thereon, of tubular chuck spindles journaled in the head, pulleys on the chuck spindles, means to rotate the pulleys, resilient, expanding chuck jaws connected to the rear end of the spindles, having inclined outer surfaces at their free ends; a chuck sleeve carriage fitted to ways in the frame, a main shaft, a cam roller thereon adapted, as the shaft is rotated, to engage with and retract the chuck sleeve carriage permitting the chuck jaws to open; chuck sleeves arranged in said chuck carriage having beveled or tapering inner margins to engage with the chuck jaws, flanges on the opposite ends of the chuck sleeves engaging with the chuck sleeve carriage, and main spiral springs arranged around the chuck jaws between the shoulders and the chuck-sleeves to force the chuck-sleeves forward into engagement with the chuck jaws and close the jaws to grip the blanks when the carriage is in its retracted position.

5. In a button turning and finishing machine, the combination with a main frame, of chucks having chuck jaws rotatably supported on the frame, means to rotate the chucks, a chuck carriage fitted to ways on the frame, chuck sleeves on the chuck carriage fitted to the chucks, a spring to force the chuck carriage and chuck sleeve rearwardly to close the jaws and means to advance the chuck carriage and chuck sleeves.

6. In a button turning and finishing machine, the combination with a suitable frame, of button blank receiving chucks supported on the frame, means to operate the chucks to receive the blanks, and means to rotate the chucks, a table for the blanks supported on the frame above the chucks, vertically moving pocket carrying members to receive the blanks from the table and to deliver them to the chucks, means to elevate the pocket carrying members away from the chucks when the tools are advanced to engage the work, means to depress the pocket carrying members, ated pins to force the blanks into the chucks when the tools are withdrawn, spring operated pins to force the blanks into the chucks from the pocket carrying members when the latter are in their depressed position, said pins having inclined cut-outs, a sliding-plate suitably arranged and having inclined faces to engage the said cut-outs to retract the pins from operative position against the tension of the springs when moved forward, a spring normally tending to force the plate to release the pins, and a cam block suitably arranged in engagement with the slide-plate, said block being provided with cam surfaces adapted to force the plate to retract the pins on the elevation of the pocket carrying members and to retain the pins retracted until said members have returned to delivery position and to release the plate to permit the quick expulsion of the blanks by the pins.

In testimony whereof I affix my signature in presence of two witnesses.

SAMUEL P. MacCORDY.

Witnesses:
C. C. SCHOENECK,
M. B. SMITH.